(12) United States Patent
Tyrberg et al.

(10) Patent No.: US 11,862,362 B2
(45) Date of Patent: Jan. 2, 2024

(54) SUBMARINE POWER CABLE WITH CURVATURE MONITORING CAPABILITY

(71) Applicant: NKT HV Cables AB, Lyckeby (SE)

(72) Inventors: Andreas Tyrberg, Lyckeby (SE); Patrik Holmberg, Ronneby (SE); Petrus Althini, Lyckeby (SE)

(73) Assignee: NKT HV Cables AB, Lyckeby (SE)

( * ) Notice: Subject to any disclaimer, the term of this patent is extended or adjusted under 35 U.S.C. 154(b) by 32 days.

(21) Appl. No.: 17/451,413

(22) Filed: Oct. 19, 2021

(65) Prior Publication Data

US 2022/0139595 A1 May 5, 2022

(30) Foreign Application Priority Data

Oct. 29, 2020 (EP) ..................................... 20204571

(51) Int. Cl.
| | |
|---|---|
| H01B 7/18 | (2006.01) |
| G01M 11/08 | (2006.01) |
| G02B 6/44 | (2006.01) |
| H01B 7/00 | (2006.01) |
| H01B 7/14 | (2006.01) |
| H01B 9/00 | (2006.01) |

(52) U.S. Cl.
CPC ......... *H01B 7/1815* (2013.01); *G01M 11/086* (2013.01); *G02B 6/4427* (2013.01); *H01B 7/0009* (2013.01); *H01B 7/14* (2013.01); *H01B 9/005* (2013.01); *H01B 9/006* (2013.01)

(58) Field of Classification Search
CPC ...... H01B 7/1815; H01B 7/0009; H01B 7/14; H01B 9/005; H01B 9/006; H01B 9/02; H01B 7/02; G01M 11/086; G01M 5/0025; G02B 6/4427
See application file for complete search history.

(56) References Cited

U.S. PATENT DOCUMENTS

| 10,502,558 | B2 * | 12/2019 | Sasaki | .................... G01B 11/18 |
| 2015/0040681 | A1 * | 2/2015 | Sarchi | ................. G01M 5/0091 73/847 |
| 2018/0266812 | A1 | 9/2018 | Sasaki et al. | |

FOREIGN PATENT DOCUMENTS

| EP | 3483579 A1 | 5/2019 |
| WO | 20100136062 A1 | 12/2010 |

OTHER PUBLICATIONS

Extended European Search Report; Application No. 20204571.2; Completed: Mar. 15, 2021; dated Mar. 23, 2021; 8 Pages.

\* cited by examiner

*Primary Examiner* — John Bedtelyon
(74) *Attorney, Agent, or Firm* — Whitmyer IP Group LLC

(57) ABSTRACT

A multi-phase submarine power cable including: a plurality of power cores arranged in a stranded configuration, and a curvature sensor including: an elastic elongated member, and a plurality of Fibre Bragg Grating, FBG, fibres, each FBG fibre extending axially along the elongated member at a radial distance from the centre of the elongated member; wherein the elongated member extends between the stranded power cores along a central axis of the multi-phase submarine power cable.

20 Claims, 2 Drawing Sheets

SUBMARINE POWER CABLE WITH CURVATURE MONITORING CAPABILITY

TECHNICAL FIELD

The present disclosure generally relates to submarine power cables.

BACKGROUND

Submarine power cables that undergo repeated, dynamic, bending variations are subjected to fatigue stress that may cause fatigue damage. Fatigue stress can occur during off-shore installation or repairs when the submarine power cable is suspended from a marine vessel to the seabed, during operation of dynamic submarine power cables suspended from floating platforms, and during operation of static submarine power cables over free-spans, for instance from the seabed to the J-tube at a stationary platform such as a wind turbine platform. The bending variations of the cable results from wave induced movements of the floating platform or vessel or by hydrodynamic loads induced by waves and currents on the suspended cable.

EP3483579 discloses a method for fatigue-monitoring of a submarine cable during off-shore operations such as installation and repairs on a marine vessel. Inclination sensors or strain gauges are mounted onto the submarine cable in the region of the vessel chute and the measurements are used to calculate the accumulated fatigue damage using an S-N fatigue curve and the Palmgren-Miner linear damage hypothesis during the off-shore operations.

EP3483579 is directed to off-shore operations monitoring and does not enable fatigue-monitoring during operation of an installed submarine power cable.

WO2010/136062 discloses an electric cable with a strain sensor embedded in a strain-transferring filler. The strain sensor extends longitudinally along the cable and includes a strain optical fibre arranged within a bending neutral region of the electrical cable.

WO2010/136062 discloses a method to measure tensile strain, i.e. axial elongation, of the electrical power cores and does not enable measurement of the cable curvature variations.

SUMMARY

In view of the above, a general object of the present disclosure is to provide multi-phase submarine power cable that solves or at least mitigates the problems of the prior art.

Another object is to provide a method of preparing a multi-phase submarine power cable for operation.

There is hence according to a first aspect of the present disclosure provided a multi-phase submarine power cable comprising: a plurality of power cores arranged in a stranded configuration, and a curvature sensor comprising: an elastic elongated member, and a plurality of Fibre Bragg Grating, FBG, fibres, each FBG fibre extending axially along the elongated member at a radial distance from the centre of the elongated member; wherein the elongated member extends between the stranded power cores along a central axis of the multi-phase submarine power cable.

The elongated member acts as a distancing member from the centre of the multi-phase submarine power cable for the FBG fibres. The local curvature C of the elongated member is determined by $C=\varepsilon/r$, where c is the strain in the FBG fibre and r is the radial distance from the centre of the elongated member to the centre of an FBG fibre. In this way, the local curvature of the elongated member and thus of the multi-phase submarine power cable can be determined. The strain that the FBG fibres are subjected to can be calculated based on electromagnetic waves reflected in the gratings of the FBG fibres.

Due to its bend stiffness and elasticity, the elongated member follows the curvature variations of the multi-phase submarine power cable. The interstice or cavity between the power cores is typically not perfectly round as it is formed between the stranded power cores. The elongated member will however due to its bend stiffness and elasticity adapt to the shape of the cavity along the axial direction of the interstice or cavity and the elongated member will therefore contact the power cores in a plurality of axial locations. This adaptation to the cavity shape in the axial direction is similar to mathematical curve fitting using a polynomial.

The elongated member may be in direct contact with one or more of the power cores in a plurality of axial locations along the axial length of the elongated member as the elongated member extends inside the interstice or cavity between the power cores.

The radial distance of the FBG fibres ensure that the curvature of the elongated member can be determined. The curvature of the multi-phase submarine power cable can thus be determined. The curvature resolution becomes very high, for example less than $0.001~\text{m}^{-1}$. Moreover, the sampling frequency of the curvature variations can be as high as 10-20 Hz.

The elongated member is provided with the FBG fibres.

The elongated member is arranged in an interstice between the power cores at the centre of the multi-phase submarine power cable.

The FBG fibres are preferably only provided in a monitored length of the multi-phase submarine power cable. The FBG fibres may transition into optical fibres without Bragg gratings as they extend towards an open end of the multi-phase submarine power cable. The FBG fibres may be spliced with the optical fibres without Bragg gratings.

The optical fibres may extend from the multi-phase submarine power cable through the open end of the cable.

The optical fibres extending from the open end may be connected to a monitoring system.

The monitoring system may be configured to transmit electromagnetic waves into the optical fibres towards the FBG fibres. The monitoring system may be configured to detect reflected electromagnetic waves from the FBG fibres in the optical fibres.

The monitoring system may be configured to calculate a curvature of the elongated member based on reflected electromagnetic waves from the FBG fibres.

The monitoring system may comprise an electromagnetic wave transmitting and detecting device, and a processing device.

The electromagnetic wave transmitting and detecting device may be configured to emit electromagnetic waves into the optical fibres and to detect reflected electromagnetic waves from the FBG fibres.

The processing device may be configured to determine the curvature of the multi-phase submarine power cable based on the detected electromagnetic waves.

The electromagnetic wave transmitting and detecting device and the processing device may be the same device or they may be different devices.

According to one embodiment the elongated member comprises a plurality of channels, and wherein the FBG fibres are fixedly arranged in a respective channel. The FBG fibres may for example be fixated by means of an adhesive in the respective channel. By placing the FBG fibres in channels, the FBG fibres will stay in the correct position during and after installation of the curvature sensor.

The FBG fibres may extend along channels that are provided in the outer surface of the elongated member or inside the elongated member.

The channels may be axial channels extending parallel with the central axis of the elongated member.

The FBG fibres may be integrated with the elongated member. For example, the FBG fibres could be placed in a composite material when the elongated member is being formed by the composite material.

According to one embodiment the plurality of FBG fibres are at least three FBG fibres. The curvature sensor may thus comprise at least three FBG fibres.

By using a third FBG fibre, an axial strain of the elongated member can also be detected. Thus, all radial bending directions as well as axial strain may be detected. The axial strain may be induced by axial tension of the elongated member or thermal expansion due to a change in temperature.

By using at least two FBG fibres, the curvature due to bending in both perpendicular axial planes, and in any plane between the perpendicular planes, of the elongated member can be determined.

According to one embodiment the FBG fibres are distributed in the circumferential direction of the elongated member. The FBG fibres may be distributed with an offset relative to each other in the circumferential direction. The FBG fibres may be displaced relative to each other in the circumferential direction of the elongated member.

The FBG fibres may be distributed evenly in the circumferential direction. If for example the curvature sensor comprises exactly three FBG fibres, the FBG fibres may be arranged 120° apart. If the curvature sensor comprises exactly four FBG fibres, the FBG fibres may be arranged 90° apart, and so on.

The FBG fibres comprise gratings, and the gratings of different FBG fibres may be axially aligned or essentially axially aligned with each other. With essentially is meant that the gratings are at most 10 cm, such as at most 5 cm, such as at most 1 cm, axially offset from each other.

According to one embodiment the elongated member is made of a composite material or a thermoplastic material.

According to one embodiment the composite material is fibreglass.

According to one embodiment the elongated member has a bending stiffness of at least 0.3 $Nm^2$, such as at least 1 $Nm^2$, such as at least 1.5 $Nm^2$, such as at least 2 $Nm^2$, such as at least 2.5 $Nm^2$, such as at least 3 $Nm^2$.

According to one embodiment the elongated member has a circular cross-section. This ensures that the elongated member will behave the same irrespective of which direction it is bent.

According to one embodiment the elongated member is a rod or a tube.

According to one embodiment the multi-phase submarine power cable is a dynamic submarine power cable or a static submarine power cable.

Dynamic multi-phase submarine power cables are designed to be subjected to wave motion. Dynamic multi-phase submarine power cables extend from a floating offshore platform to the seabed when installed. Dynamic multi-phase submarine power cables may be used for deep-sea applications, for example in the field of oil and gas exploration or floating wind.

Static multi-phase submarine power cables extend on the seabed but may extend from the seabed via a tube up to a stationary offshore platform, such as an offshore wind turbine platform. Static multi-phase submarine power cables may also be subjected to wave motion in the region between the seabed and the tube.

There is according to a second aspect of the present disclosure provided a method of preparing a multi-phase submarine power cable for operation, the method comprising: a) providing a multi-phase submarine power cable comprising a plurality of power cores arranged in a stranded configuration, the multi-phase submarine power cable having an open end, b) providing a curvature sensor comprising an elastic elongated member, a plurality of Fibre Bragg Grating, FBG, fibres extending axially along the elongated member at a radial distance from the centre of the elongated member, and c) pushing the curvature sensor from the open end of the multi-phase submarine power cable in between the stranded power cores and along a central axis of the multi-phase submarine power cable.

The curvature sensor is thus placed inside the multi-phase submarine power cable after the multi-phase submarine power cable has been manufactured.

One embodiment comprises attaching an end portion of the multi-phase submarine power cable to a hang-off, the end portion being provided with the open end, wherein step c) is carried out after the multi-phase submarine power cable has been attached to the hang-off.

The hang-off is a device by which the multi-phase submarine power cable is fixated to an offshore platform. The offshore platform may be a floating platform or a stationary platform.

According to one embodiment the curvature sensor is pushed to a section of the multi-phase submarine power cable that is arranged in a bend stiffener or a bellmouth.

The section of the multi-phase submarine power cable that extends through a bend stiffener or bellmouth is the portion exposed to highest fatigue stress. Thus, by placing the curvature sensor in this section of the multi-phase submarine power cable, the area with highest stress can be monitored.

According to one example the elongated member and the FBG fibres may extend along at least 50% of the length, such as at least 60% of the length, such as at least 70% of the length, such as at least 80% of the length, such as at least 90% of the length, or the entire length, of the bend stiffener or bellmouth.

According to one embodiment the elongated member comprises a plurality of channels, and wherein the FBG fibres are arranged in a respective channel.

According to one embodiment the plurality of FBG fibres are at least three FBG fibres.

According to one embodiment the FBG fibres are distributed in the circumferential direction of the elongated member.

Generally, all terms used in the claims are to be interpreted according to their ordinary meaning in the technical field, unless explicitly defined otherwise herein. All references to "a/an/the element, apparatus, component, means, etc.," are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
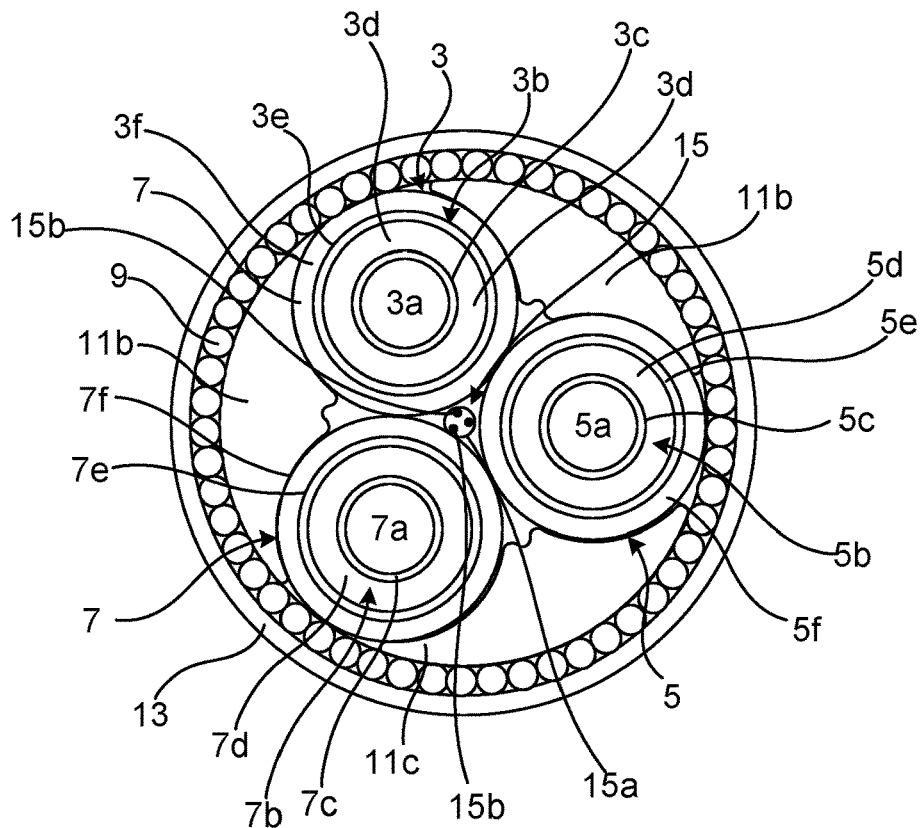
FIG. 1 schematically shows a cross-section of an example of a multi-phase submarine power cable.

FIG. 1 shows a cross-sectional view of an example of a multi-phase submarine power cable 1. The multi-phase submarine power cable 1 according to the present example is a three-phase submarine power cable. The multi-phase submarine power cable could alternatively be configured for more than three phases.

The multi-phase submarine power cable 1 comprises a plurality of power cores 3, 5, 7. In the present example, the number of power cores is equal to three. Each power core 3, 5, 7 is configured to carry a current of a respective electric phase.

The power cores 3, 5 and 7 are arranged in a stranded configuration. The power cores 3, 5, 7 are stranded. The power cores 3, 5 and 7 have a lay direction and a core stranding pitch.

Each power core 3, 5, 7 comprises a respective conductor 3a, 5a, 7a.

Each power core 3, 5, 7 comprises an insulation system 3b, 5b, 7b arranged around the respective conductor 3a, 5a, 7a.

Each insulation system 3b, 5b, 7b may comprise an inner semiconductive layer 3c, 5c, 7c. The inner semiconductive layer 3c, 5c, 7c is a conductor screen. The inner semiconductive layer 3c, 5c, 7c is arranged around the respective conductor 3a, 5a, 7a.

Each insulation system 3b, 5b, 7b may comprise an insulation layer 3d, 5d, 7d. The insulation layer 3d, 5d, 7d is arranged around the respective inner semiconductive layer 3c, 5c, 7c. Each insulation layer 3d, 5d, 7d may for example comprise cross-linked polyethylene (XLPE), impregnated paper tapes, or polypropylene.

Each insulation system 3b, 5b, 7b may comprise an outer semiconductive layer 3e, 5e, 7e. The outer semiconductive layer 3e, 5e, 7e is an insulation screen. The outer semiconductive layer 3e, 5e, 7e is arranged around the respective insulation layer 3d, 5d, 7d.

Each power core 3, 5, 7 may comprise a water barrier 3f, 5f, 7f. Each water barrier 3f, 5f, 7f may be arranged around the respective outer semiconductive layer 3e, 5e, 7e. Each water barrier 3, 5e, 7e may for example comprise a metallic sheath. Each metallic sheath may for example comprise copper, stainless steel, aluminium or lead. Each metallic sheath may for example be one or more metal sheets that is/are folded around the respective insulation system 3b, 5b, 7b and longitudinally welded along the length of the multi-phase submarine power cable 1.

The water barriers 3f, 5f, 7f may be corrugated in the axial direction in case the multi-phase submarine power cable 1 is a dynamic submarine power cable. The water barriers 3f, 5f, 7f may be smooth in case the multi-phase submarine power cable 1 is a static multi-phase submarine power cable.

The multi-phase submarine power cable 1 may comprise a plurality of elongated armour wires 9 forming an armour layer that surrounds the stranded power cores 3, 5, 7. The armour wires 9 may be arranged helically outside the stranded power cores 3, 5, 7 in the axial direction of the multi-phase submarine power cable 1.

The multi-phase submarine power cable 1 may comprise filler profiles 11a-11c. The filler profiles 11a-11c are arranged between adjacent power cores 3, 5, 7 radially inside the armour layer. The filler profiles 11a-11c are stranded together with the power cores 3, 5, 7.

The multi-phase submarine power cable 1 comprises a curvature sensor 15. The curvature sensor 15 is configured to detect curvature variations and bending of the multi-phase submarine power cable 15.

The curvature sensor 15 comprises an elastic elongated member 15a and a plurality of FBG fibres 15b extending axially along the elongated member 15a.

The elongated member 15a may have an elasticity such that it is able to bend as in much as the allowed bending of the multi-phase submarine power cable without plastic deformation.

The elongated member 15a may comprise or consist of a composite material. The composite material may for example be fibreglass. The elongated member 15a may according to other variations comprise a thermoplastic polymer. The thermoplastic polymer may for example be a high-density polyethylene (HDPE) or polypropylene.

The elongated member 15a may have a bending stiffness, EI, of at least 0.3 Nm$^2$. The elongated member 15a may for example have a bending stiffness of at least 1 Nm$^2$, such as at least 1.5 Nm$^2$, such as at least 2 Nm$^2$, such as at least 2.5 Nm$^2$, such as at least 3 Nm$^2$.

The elongated member 15a may be a rod or a tube. The elongated member 15a may have a circular cross-section.

The elongated member 15a is arranged between the stranded power cores 3, 5 and 7. The elongated member 15a is arranged along the central axis of the multi-phase submarine power cable 1. The elongated member 15a is arranged in an interstice between the stranded power cores 3, 5, 7 at the centre of the multi-phase submarine power cable 1.

The curvature sensor 15 is arranged between the stranded power cores 3, 5, 7.

The FBG fibres 15b are spaced apart from each other. The FBG fibres 15b are arranged offset from the centre of the elongated member 15a. The FBG fibres 15b are arranged at a radial distance from the centre of the elongated member 15a.

The FBG fibres 15b may comprise gratings distributed along the length of the FBG fibres 15b. The gratings of different FBG fibres 15b may be axially aligned or essentially axially aligned. The curvature in different axial planes may thereby be determined in the same axial measurement points or regions.

Figure 2:
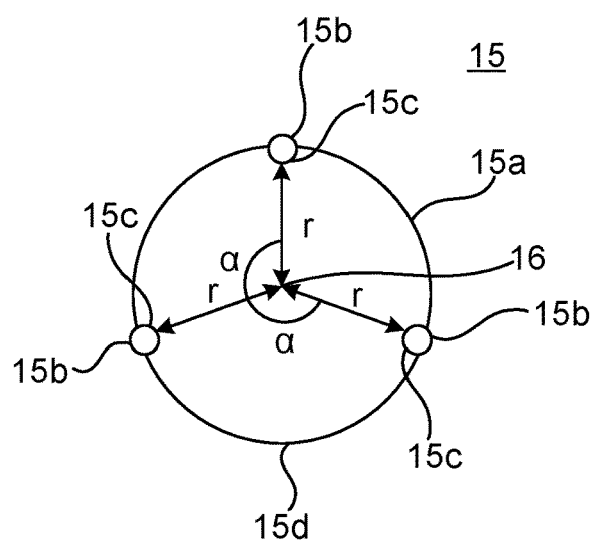
FIG. 2 schematically depicts a cross-sectional view of a curvature sensor.

FIG. 2 shows a cross-section of an example of the curvature sensor 15. In this example, the elongated member 15a has a plurality of channels 15c provided in the outer surface 15d of the elongated member 15a. The channels 15c are recesses in the outer surface 15d. The channels 15c extend axially along the elongated member 15a. The channels 15c may be straight channels. Each FBG fibre 15b is arranged in a respective channel 15c.

The channels 15c are distributed in the circumferential direction of the elongated member 15a. The channels 15c may be evenly distributed in the circumferential direction of the elongated member 15a.

In the present example, the curvature sensor 15 comprises three FBG fibres 15b. The FBG fibres 15b are arranged in a respective channel 15c, which are arranged at an angle α of 120° from each other. The FBG fibres 15b are arranged fixed in the respective channel 15c. The FBG fibres 15b may for example be fixed in the channels 15c by means of an adhesive. The radial distance r from the centre 16 of the elongated member 15a to the FBG fibres 15b may be the same for each FBG fibre 15b, or alternatively the radial distances r may differ. The radial distance r may be from the centre of the elongated member 15a to the centre of the FBG fibres 15b.

The channels could instead of being provided in the outer surface be arranged in the interior of the elongated member.

The elongated member may according to one example be provided with an outer protective layer. The protective layer may for example comprise a polymer sheath such as a sheath comprising polyethylene or polypropylene, or a metal sheath. The protective layer is configured to protect the FBG fibres and/or keep the FBG fibres in place in the channels.

Figure 3:
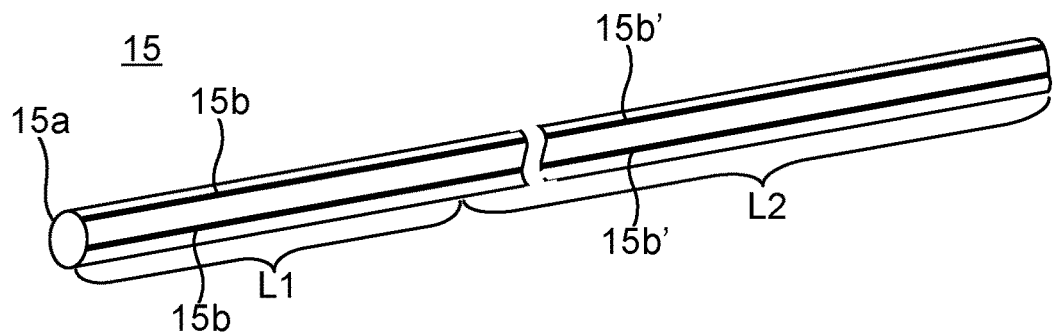
FIG. 3 schematically shows a perspective view of a curvature sensor.

FIG. 3 shows a perspective view of the curvature sensor 15. The curvature sensor 15 is provided with the FBG fibres 15b extending axially along the elongated member 15a for a monitored length L1 that corresponds to the monitored region of the multi-phase submarine power cable 1 where curvature variations are to be monitored. The length of axial extension of the FBG fibres 15b define the monitored length L1. The elongated member 15a may extend along the central axis of the multi-phase submarine power cable 1 from the monitored region all the way out through an open end of the multi-phase submarine power cable 1. The elongated member 15a is provided with the FBG fibres 15b along the entire monitored length L1 and with optical fibres 15b' without Bragg gratings spliced with a respective one of the FBG fibres 15b for a non-monitored length L2. The non-monitored length L2 is a non-monitored region of the multi-phase submarine power cable 1. The total length of the elongated member 15a may be the sum of the monitored length L1 and the non-monitored length L2. The optical fibres 15b' extend from an open end of the multi-phase submarine power cable 1.

As an example, the monitored length L1 may be 1-10 m, and the non-monitored length L2 may be 1-50 m.

Figure 4:
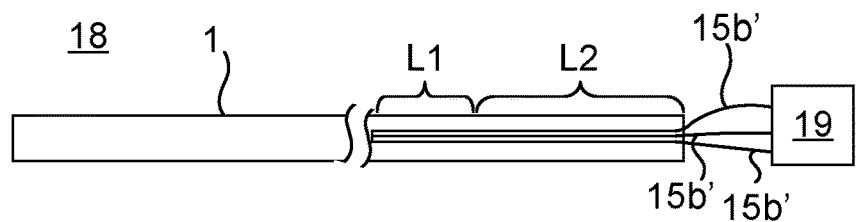
FIG. 4 schematically shows a side view of a multi-phase submarine power cable connected to a monitoring system.

FIG. 4 schematically shows a system 18 comprising the multi-phase submarine power cable 1 and a monitoring system 19. The optical fibres 15b' are connected to the monitoring system 19. The monitoring system 19 is configured to emit electromagnetic waves, e.g. infrared, visible or ultraviolet light into the optical fibres 15b'. The monitoring system 19 is configured to detect electromagnetic waves reflected by the FBG fibres 15b in the optical fibres 15b'.

The monitoring system 19 is configured to determine the curvature distribution at discrete locations along the elongated member 15 based on the reflected electromagnetic waves. The discrete locations correspond to the locations of the gratings of the FBG fibres 15b. The monitoring system 19 is configured to determine the curvature radius of the elongated member 15a at the discrete locations based on the elongation of the FBG fibres 15b. The elongation that the gratings in the FBG fibres 15b are subjected to can be calculated based on the reflected electromagnetic waves used in the measurement. The monitoring system 19 is configured to determine the curvature of the elongated member 15 at the location of the gratings and thus of the multi-phase submarine power cable 1 along the monitored length L1, in different axial planes, based on the strain in the FBG fibres 15b and the radial distance r from the centre C of the elongated member 15a to the FBG fibres 15b.

The curvature of the elongated member is determined by the curvature of the multi-phase submarine power cable 1. The variations in curvature of the multi-phase submarine power cable 1 can thereby be determined over the length of the monitored length L1. The monitoring system 19 may be configured to compare the curvature with those of a model of the multi-phase submarine power cable 1 to determine whether the curvature values are within acceptable limits.

According to one example, the monitoring system 19 may comprise an electromagnetic wave transmitting and detecting device and a processing device. The electromagnetic wave transmitting and detecting device and the processing device may be the same device, i.e. arranged in the same housing, or they may be different devices. For example, the electromagnetic wave transmitting and detecting device may be connected by wire or wirelessly to the processing device. The processing device may be configured to process the measurements from the FBG fibres detected by the electromagnetic wave transmitting and detecting device, to determine the curvature distribution at discrete locations along the elongated member 15a, as will be explained in the following.

According to one example the monitoring system 19 may be configured to determine strain ranges based on the curvatures. The monitoring system 19 may use a mathematical model of the multi-phase submarine power cable 1 to determine the strain or stress ranges in the internal cable components. The mathematical model may provide strain ranges in the most fatigue-sensitive component of the multi-phase submarine power cable. This component may for example be the water barrier and/or the conductor.

The monitoring system 19 may be configured to determine the number of occurrences of each strain or stress range. This can be performed for example by using the rain flow counting method.

The monitoring system 19 may be configured to determine the number of cycles to failure of the most fatigue-sensitive component for each strain or stress range. The number of cycles to failure for the strain or stress ranges can for example be determined using an S—N fatigue curve for the most fatigue-sensitive component such as the water barrier or the conductor.

The monitoring system 19 may be configured to determine a fatigue damage of the multi-phase submarine power cable 1 based on the number of occurrences of each strain or stress range and the number of cycles to failure for each of the strain ranges. The Palmgren-Miner linear damage hypothesis can be used to determine the fatigue damage.

The monitoring system 19 may be configured to repeat the steps above as new curvature variations are detected by changes in the detected electromagnetic waves. The fatigue damage of the current iteration is added to the fatigue damage of the previous iteration. An accumulated fatigue damage is thus obtained.

In this way, real-time monitoring of the fatigue damage of the multi-phase submarine power cable 1 may be performed.

Figure 5:
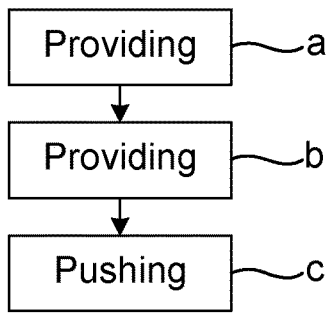
FIG. 5 is a flowchart of a method of preparing a multi-phase submarine power cable for operation.

FIG. 5 is a flowchart of a method of preparing the multi-phase submarine power cable 1 for operation.

In a step a) the multi-phase submarine power cable 1 is provided. The curvature sensor 15 is at this time not installed in the multi-phase submarine power cable 1.

In a step b) the curvature sensor 15 is provided.

In a step c) the curvature sensor 15 is installed in the multi-phase submarine power in cable 1 by pushing the curvature sensor 15 into the multi-phase submarine power cable 1. The multi-phase submarine power cable 1 has an open end through which the curvature sensor 15 is inserted into the multi-phase submarine power cable 1. The curvature sensor 15 is pushed in between the stranded power cores 3, 5, 7. The curvature sensor 15 is pushed so far into the multi-phase submarine power cable 1 that the monitoring length L1 provided with the FBG fibres 15b reaches and aligns with the monitoring region of the multi-phase submarine power cable 1.

The curvature sensor 15 may be pushed into the multi-phase submarine power cable 1 through its open end after the multi-phase submarine power cable 1 has been attached to a hang-off on an offshore platform. In particular, an end portion of the multi-phase submarine power cable 1 is attached to the hang-off. The curvature sensor 15 may be pushed to a section of the multi-phase submarine power cable 1 arranged in a bend restricting device. For example, the entire monitored length L1 of the elongated member 15a may be arranged in the bend restricting device.

Figure 6:
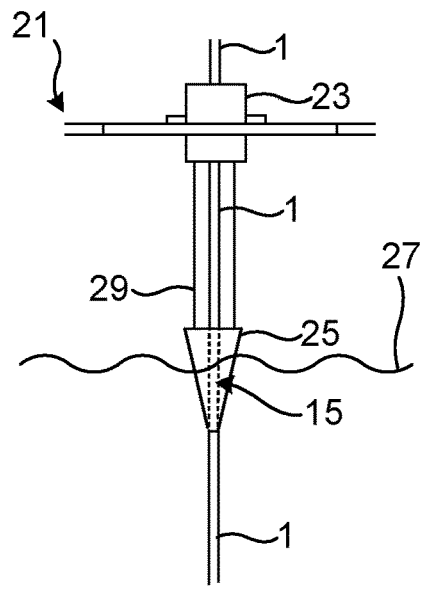
FIG. 6 schematically depicts a multi-phase submarine power cable connected to a hang-off at an offshore platform and to a bend restricting device.

FIG. 6 schematically shows an offshore platform 21. In this example, the offshore platform 21 is a floating platform but could alternatively be a stationary platform. The multi-phase submarine power cable 1 is in this example a dynamic multi-phase submarine power cable 1.

The multi-phase submarine power cable 1 is fixed to the offshore platform 21 by means of a hang-off 23. The multi-phase submarine power cable 1 is suspended into the sea 27 from the hang-off 23. The installation includes a bend restricting device 25 provided on the multi-phase submarine power cable 1. The bend restricting device 25 may be provide around the multi-phase submarine power cable 1 as the multi-phase submarine power cable 1 exits a rigid structure such as a tube 29. The bend restricting device 25 may for example be a bend stiffener, as shown in the example, or a bellmouth. The curvature sensor 15 and in particular the monitoring length L1 thereof, with the FBG fibres 15b is arranged in the bend restricting device 25. This is the region of the multi-phase submarine power cable 1 which is normally subjected to the highest fatigue stress.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A multi-phase submarine power cable comprising:
a plurality of power cores arranged in a stranded configuration, and
a curvature sensor comprising:
an elastic elongated member, and
a plurality of Fibre Bragg Grating, FBG, fibres, each FBG fibre extending axially along the elongated member at a radial distance from a centre of the elongated member;
wherein the elongated member extends between the stranded power cores along a central axis of the multi-phase submarine power cable;
wherein the elongated member is in direct contact with one or more of the power cores in a plurality of axial locations along an axial length of the elongated member as the elongated member extends inside an interslice or cavity between the power cores.

2. The multi-phase submarine power cable as claimed in claim 1, wherein the elongated member comprises a plurality of channels, and wherein the FBG fibres are fixedly arranged in a respective channel.

3. The multi-phase submarine power cable as claimed in claim 2, wherein the FBG fibres are distributed in the circumferential direction of the elongated member.

4. The multi-phase submarine power cable as claimed in claim 2, wherein the elongated member is made of a composite material or a thermoplastic material.

5. The multi-phase submarine power cable as claimed in claim 2, wherein the elongated member has a circular cross-section.

6. The multi-phase submarine power cable as claimed in claim 1, wherein the plurality of FBG fibres are at least three FBG fibres.

7. The multi-phase submarine power cable as claimed in claim 1, wherein the FBG fibres are distributed in the circumferential direction of the elongated member.

8. The multi-phase submarine power cable as claimed in claim 1, wherein the elongated member is made of a composite material or a thermoplastic material.

9. The multi-phase submarine power cable as claimed in claim 1, wherein the elongated member has a bending stiffness of at least $0.3$ $Nm^2$.

10. The multi-phase submarine power cable as claimed in claim 9, wherein the bending stiffness of the elongated member is at least $1$ $Nm^2$.

11. The multi-phase submarine power cable as claimed in claim 10, wherein the bending stiffness of the elongated member is at least $3$ $Nm^2$.

12. The multi-phase submarine power cable as claimed in claim 1, wherein the elongated member has a circular cross-section.

13. The multi-phase submarine power cable as claimed in claim 1, wherein the elongated member is a rod or a tube.

14. The multi-phase submarine power cable as claimed in claim 1, wherein the multi-phase submarine power cable is a dynamic submarine power cable or a static submarine power cable.

15. A method of preparing a multi-phase submarine power cable for operation, the method comprising:
a) providing a multi-phase submarine power cable including a plurality of power cores arranged in a stranded configuration, the multi-phase submarine power cable having an open end,
b) providing a curvature sensor including an elastic elongated member and a plurality of Fibre Bragg Grating, FBG, fibres extending axially along the elongated member at a radial distance from a centre of the elongated member, and
c) pushing the curvature sensor from the open end of the multi-phase submarine power cable in between the stranded power cores and along a central axis of the multi-phase submarine power cable;
wherein the elongated member is in direct contact with one or more of the power cores in a plurality of axial locations along an axial length of the elongated member as the elongated member extends inside an interslice or cavity between the power cores.

16. The method as claimed in claim 15, comprising attaching an end portion of the multi-phase submarine power cable to a hang-off, the end portion being provided with the open end, wherein step c) is carried out after the multi-phase submarine power cable has been attached to the hang-off.

17. The method as claimed in claim 16, wherein the curvature sensor is pushed to a section of the multi-phase submarine power cable that is arranged in a bend stiffener or a bellmouth.

18. The method as claimed in claim 15, wherein the elongated member comprises a plurality of channels, and wherein the FBG fibres are arranged in a respective channel.

19. The method as claimed in claim 15, wherein the plurality of FBG fibres are at least three FBG fibres.

20. The method as claimed in claim 15, wherein the FBG fibres are distributed in the circumferential direction of the elongated member.

\* \* \* \* \*